United States Patent
Burke et al.

(10) Patent No.: US 9,836,965 B2
(45) Date of Patent: Dec. 5, 2017

(54) MOVE OVER SLOW DRIVERS

(71) Applicants: Bertram V Burke, Lecanto, FL (US);
Michaela C Burke, Lecanto, FL (US)

(72) Inventors: Bertram V Burke, Lecanto, FL (US);
Michaela C Burke, Lecanto, FL (US)

(*) Notice: Subject to any disclaimer, the term of this patent is extended or adjusted under 35 U.S.C. 154(b) by 0 days.

(21) Appl. No.: 15/605,702

(22) Filed: May 25, 2017

(65) Prior Publication Data
US 2017/0294117 A1 Oct. 12, 2017

Related U.S. Application Data

(63) Continuation-in-part of application No. 15/397,419, filed on Jan. 3, 2017, which is a continuation-in-part of application No. 15/248,574, filed on Aug. 26, 2016, now Pat. No. 9,601,011.

(60) Provisional application No. 62/470,857, filed on Mar. 13, 2017, provisional application No. 62/461,064, filed on Feb. 20, 2017, provisional application No. 62/210,357, filed on Aug. 26, 2015.

(51) Int. Cl.
| | |
|---|---|
| *G08B 21/00* | (2006.01) |
| *G08G 1/017* | (2006.01) |
| *G08G 1/052* | (2006.01) |
| *G06K 9/00* | (2006.01) |
| *H04N 7/18* | (2006.01) |
| *G06K 9/78* | (2006.01) |
| *G01S 19/13* | (2010.01) |
| *G01S 17/93* | (2006.01) |

(52) U.S. Cl.
CPC .......... *G08G 1/0175* (2013.01); *G01S 17/936* (2013.01); *G01S 19/13* (2013.01); *G06K 9/00255* (2013.01); *G06K 9/00711* (2013.01); *G06K 9/00791* (2013.01); *G06K 9/78* (2013.01); *G08G 1/052* (2013.01); *H04N 7/181* (2013.01); *G06K 2209/15* (2013.01)

(58) Field of Classification Search
CPC .................................................... G08G 1/052
USPC ............................... 340/435, 438, 463, 936
See application file for complete search history.

(56) References Cited

U.S. PATENT DOCUMENTS

2004/0193347 A1* 9/2004 Harumoto .......... B60R 21/0132
701/45

* cited by examiner

*Primary Examiner* — Jeffery Hofsass
(74) *Attorney, Agent, or Firm* — Mark Terry

(57) ABSTRACT

A method and system for logging and reporting on slow drivers in fast and middle lanes is disclosed. The system detects a slow vehicle in front of an automobile based on speed data from an OBD system, stores images of a rear of the slow vehicle using a forward facing video camera, detects passing of the slow vehicle on the left side of the automobile using a proximity sensor, stores images of a front of the slow vehicle using a rear facing video camera, after the automobile has passed the slow vehicle, stores global position data of the automobile using a GPS system, and transmits the speed data, the images of the rear of the slow vehicle, images of the front of the slow vehicle and the global position data that was taken and stored to the third party via the communications network, using the transmitter.

19 Claims, 19 Drawing Sheets

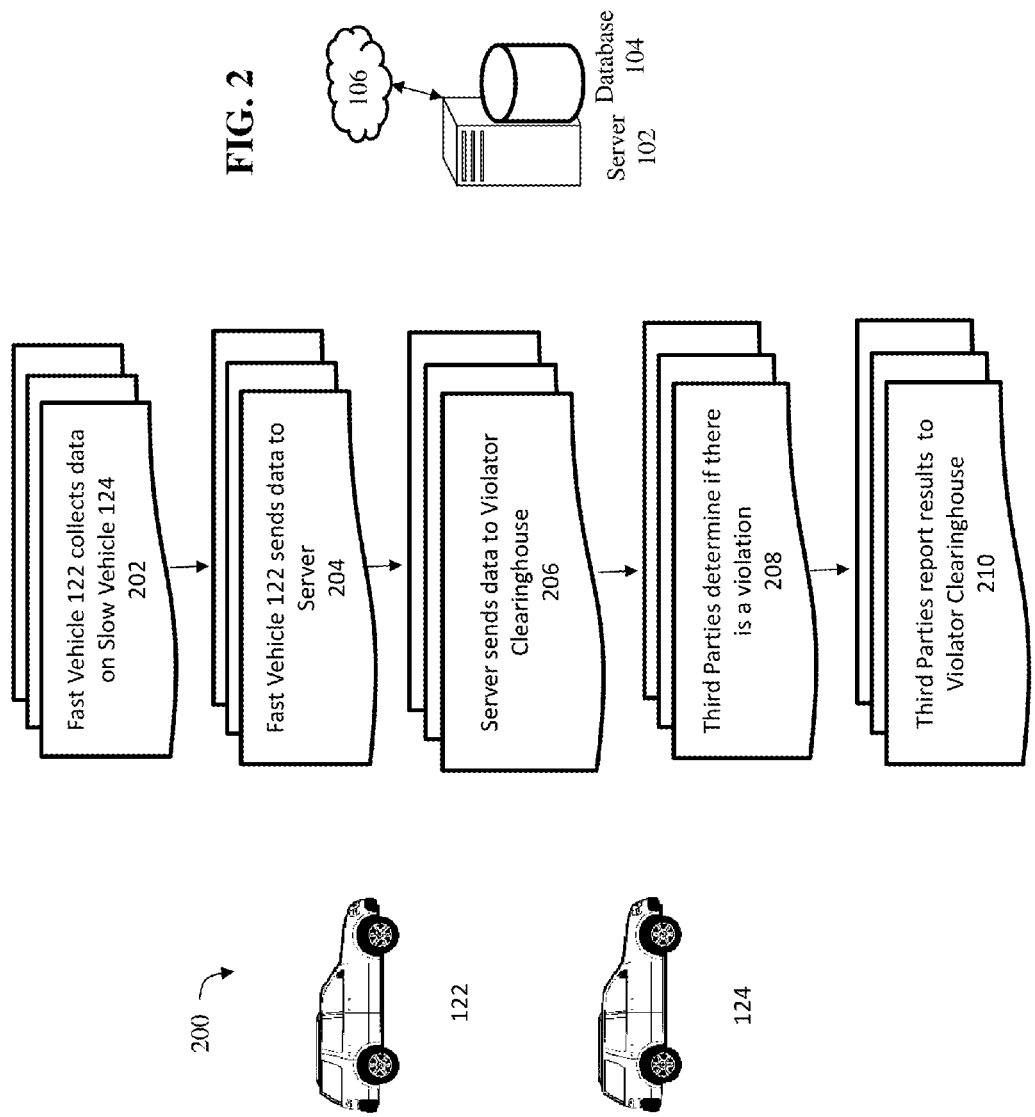

MOVE OVER SLOW DRIVERS

CROSS-REFERENCE TO RELATED APPLICATIONS

This patent application claims priority to provisional patent application No. 62/470,857 filed Mar. 13, 2017, and patent application No. 62/461,064 filed Feb. 20, 2017. This patent application also claims priority to patent application Ser. No. 15/397,419 filed Jan. 3, 2017, titled "Monitoring and Reporting Slow Drivers in Fast Highway Lanes," which claims priority to patent application Ser. No. 15/248,574 filed Aug. 26, 2016 (now U.S. Pat. No. 9,601,011), which claims priority to provisional patent application No. 62/210,357 filed Aug. 26, 2015, titled "Monitoring and Reporting Slow Drivers in Fast highway Lanes." The subject matter of patent application Nos. 62/470,857, 62/461,064, Ser. Nos. 15/397,419, 15/248,574 and 62/210,357 are hereby incorporated by reference in their entirety.

TECHNICAL FIELD

The technical field relates generally to vehicles, such as cars, trucks, vans, motor homes, etc., and, more specifically, to processes for improving vehicle driver behavior on highways.

BACKGROUND

Every day on highways and roads across the U.S. and the world, slow drivers often block faster vehicles in fast or middle lanes. In support for blocking behavior being a legal problem, the United States Uniform Vehicle Code states: Upon all roadways any vehicle proceeding at less than the normal speed of traffic at the time and place and under the conditions then existing shall be driven in the right-hand lane traffic permitting. It is also illegal in many states in the U.S. to fail to yield to faster moving traffic that is attempting to overtake slower traffic in the fast lane. Now a common problem arising from the behavior of slow violating drivers blocking faster drivers is that faster drivers often resort to dangerous tailgating. These actions can lead to road rage and potential danger for all surrounding vehicles.

A reporting driver hoping to pass a slow motorist in the "fast lane" can be stuck in an awkward situation. One strategy, which is dangerous and illegal, is to drive very close to the "fast lane" driver's bumper (tailgating). The National Safety Council estimates 38,300 people were killed and 4.4 million injured on U.S. roads in 2015, which saw the largest one-year percentage increase in deaths in half a century, resulting in an average of 105 deaths and 12,055 injuries per day. Many accidents are caused by slow drivers in the left lane. These slow drivers annoy other impatient drivers who are driving faster, causing them to move in and out of traffic, which results in accidents.

It should also be noted that many drivers also drive too slow in the middle lane and block faster drivers from proceeding ahead. This can also apply to a two lane road. In this case the one lane can be considered the fast lane. No matter how many lanes a slow vehicle should not block a faster vehicle. This type of driving violation may be almost invisible to the casual observer. This is because when traffic moves, the infraction of slow driving in the middle lane effectively disappears to the casual observer. Therefore, the problem caused by slow drivers in the fast or middle lanes can be difficult to identify and ascertain.

Various approaches exist for monitoring vehicles in lanes on highways and roads. Two well-known approaches employ a sensor to measure vehicle speeds in multiple lane highways from a fixed overhead structure. Another known approach also employs a sensor used from a fixed physical position to monitor vehicles in their respective lanes. But none of the above cited approaches detect and solve the problem of slow drivers blocking the path of faster drivers in the left or middle lane of roads and highways.

Unfortunately, certain automobile associations instruct slow drivers to stay in the middle lane, regardless of the speed they are driving and even if the right lane is unoccupied.

Therefore, a need exists for improvements over the current state, and more particularly for more efficient methods and systems for improving the driving behavior of drivers on the public highways, namely, slow drivers in both fast and middle lanes.

SUMMARY

A method and system for logging and reporting on slow drivers in fast and middle lanes. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

A method and system for logging and reporting on slow drivers that block faster vehicles in fast and middle lanes is disclosed. The system includes a forward facing video camera configured for capturing images of a license plate of a slow vehicle in front of the fast vehicle; a rear facing video camera configured for capturing images of a face of a driver of the slow vehicle, after the automobile has passed the slow vehicle; an OBD system for recording speed data; a GPS system for recording global positioning data; a proximity sensor for detecting presence of the slow vehicle on a left side of the automobile when the automobile passes the slow vehicle; a transmitter configured for wirelessly transmitting information to a third party via a communications network; and a processor communicatively coupled with the forward facing video camera, the rear facing video camera, the OBD system, the GPS system, and the proximity sensor, wherein the processor is configured for: a) detecting the slow vehicle in front of the automobile based on the speed data from the OBD system; b) taking and storing images of a rear of the slow vehicle using the forward facing video camera; c) detecting passing of the slow vehicle on the left side of the automobile using the proximity sensor; d) taking and storing images of a front of the slow vehicle using the rear facing video camera, after the automobile has passed the slow vehicle; e) taking and storing global position data of the automobile using the GPS system; and f) transmitting the speed data, the images of the rear of the slow vehicle, images of the front of the slow vehicle and the global position data that was taken and stored to the third party via the communications network, using the transmitter.

BRIEF DESCRIPTION OF THE DRAWINGS

The accompanying drawings, which are incorporated in and constitute a part of this disclosure, illustrate various example embodiments. In the drawings:

FIG. 2 is a diagram showing the data flow of the general process for logging and reporting on slow drivers in a fast or a middle lane, according to an example embodiment;

DETAILED DESCRIPTION

Figure 1:
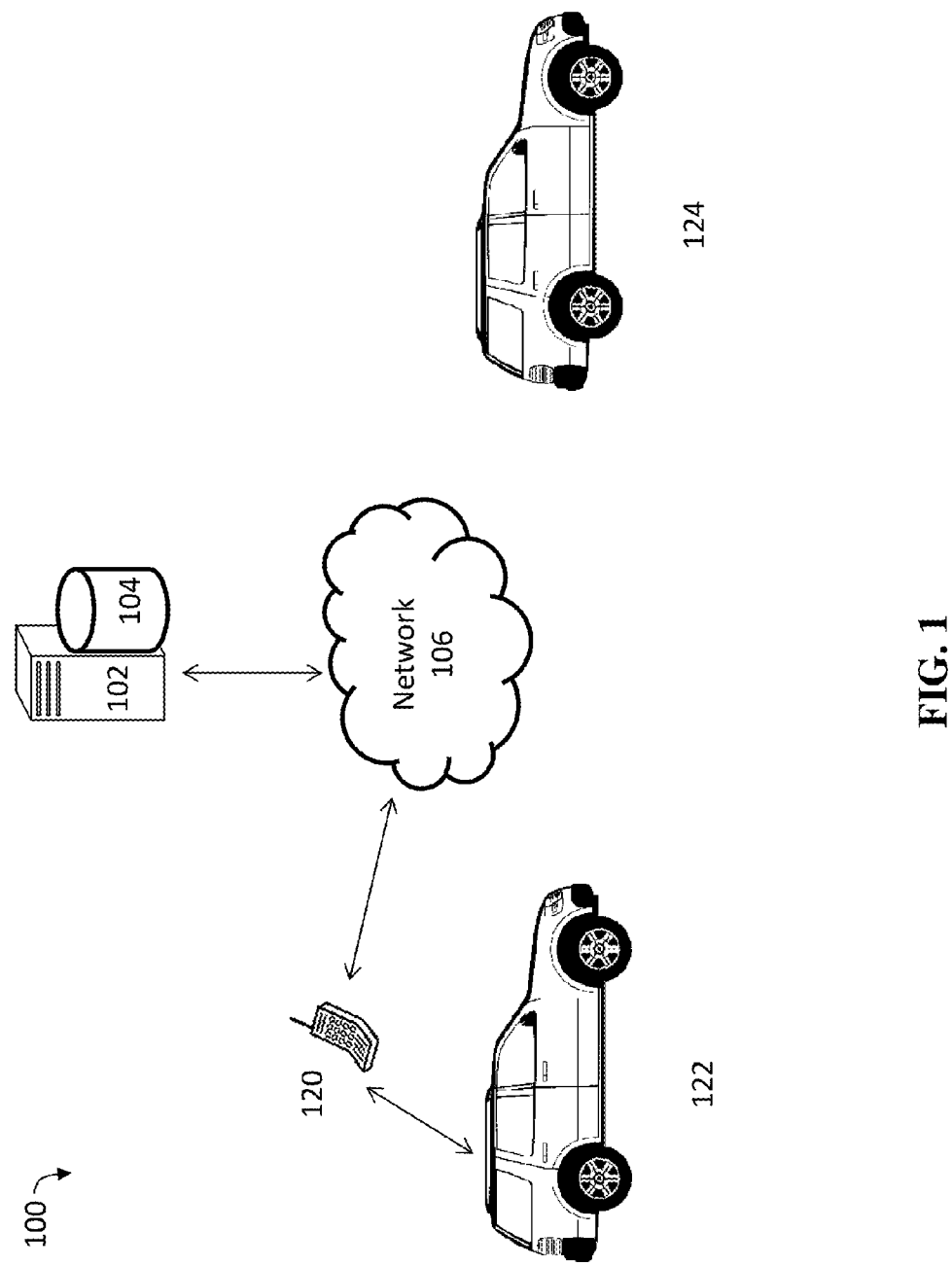
FIG. 1 is a diagram of an operating environment that supports a method and system for logging and reporting on slow drivers in fast or middle lanes who are blocking faster drivers, according to an example embodiment.

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments increase highway safety. Every day on highways and roads across the U.S. and the world, slow drivers often block faster vehicles in fast or middle lanes. The disclosed embodiments lessen and hopefully eliminate such violating behavior by encouraging all drivers to purchase and install a retrofit system for their existing vehicles. Alternatively, when purchasing a new vehicle, owners can make sure that the OEM (original equipment manufacturer) and the dealers from whom they made the purchase had the foresight to automatically include the disclosed embodiments in all of their new vehicles.

Once the disclosed embodiments are installed in a vehicle, the driver can then become a reporting driver and use the invention to automatically capture, record and report other drivers when they are blocking highway lanes. Once the violating behavior is recorded and reported the data collected is automatically sent to the Violator Clearinghouse and the appropriate third parties, i.e. the police, the municipal courts, insurance companies, etc. After the third parties review the collected information, they will send the reporting driver feedback as to their decisions and any actions that have or will take in regards to the data collected by the reporting driver. The invention collects the data needed by the court to adjudicate if a slow driver is blocking faster traffic. Drivers who use the system will also be able to video and report other traffic violations such as the running of red lights, not moving over for stopped police cars, school bus infractions, texting while driving, drunk driving, etc.

The claimed subject matter improves over the prior art because it only requires one vehicle (the reporting vehicle) to collect, record and report violating behavior of any vehicle with or without the invention; therefore, providing a more efficient, safe and precise way for reporting drivers to monitor and report slow drivers who are blocking faster drivers in the fast or middle lanes. This can also apply to a two lane road. In this case the one lane can be considered the fast lane. No matter how many lanes a slow vehicle should not block a faster vehicle.

All drivers have the right to have the system in their vehicle. Drivers who wish to report violating drivers must have the system. Vehicles do not have to have the system to be reported as violating drivers. The report of the violating drivers will still go to the Violator Clearinghouse.

The claimed subject includes the following means of collecting violating data via equipment housed in and operating in one or more standard vehicles owned or rented and operated by volunteer reporting drivers or a vehicle operated by a police officer, using the invention.

Once the violating information is housed in the Violator Clearinghouse, the licensed parties i.e. courts, police departments, insurance companies, etc., can select a "set" or "all" of the violation data. The court can recommend additional data collection at any time.

The technology employed to capture and report violating behavior is: (1) a front facing video camera on fast reporting vehicle being used to record slow violating vehicles that are blocking faster traffic in either the fast or middle lane, (2) a rear facing video camera on a reporting vehicle that uses facial recognition to capture the identity of the slow driver when his vehicle is passed, (3) fast vehicle sends a distinctive message to slow vehicle to move over, (4) using the fast reporting vehicle's (on-board diagnostic) OBD II diagnostic computer to determine the speed a faster vehicle was traveling prior to being blocked by a slow vehicle and the speed the slow driver was going when the faster vehicle is positioned behind the slow blocking vehicle, (5) when a faster reporting vehicle is passing a slower vehicle on its right side it uses using a proximity presence-absences sensor to verify that the passing by the faster reporting vehicle has been documented, (6) by having faster reporting vehicle using GPS technology and GPS data feeds to determine the highway mile marker and the municipality where the blocking incident occurred, plus positioning of the slow violating vehicle(s) with the option of determining the position of other vehicles while the violating incidents are in progress. (7) application of an Identification Module that uses a barcode reader on the reporting vehicle to receive data from a barcode that is connected to the OBD 11 or the Internet. A proximity sensor is a sensor able to detect the presence of nearby objects without any physical contact. A proximity sensor often emits an electromagnetic field or a beam of electromagnetic radiation (infrared, for instance), and looks for changes in the field or return signal. A proximity sensor may be capacitive, magnetic, optical, RADAR or LIDAR.

A bar code could contain any of the following: name of owner of the vehicle, their address, phone/cell number, any citations, arrest record, etc. with the option of an identification of the driver with a thumb print, eye scan, password, etc. This information would be updated periodically by the Motor Vehicle Agency, Police Department, etc. This information would be helpful to law enforcement when an officer pulls a driver over, effectively, allowing the officer to know pertinent information about the owner of the vehicle prior to leaving his vehicle. Even if the driver is not the owner of the vehicle, this information helps by association, etc.

All the above violating information will then be sent to the Violator Clearinghouse 102 that will record and organize the driver's records and send the information to third parties, i.e. police, courts, insurance companies and the reporting drivers that are aiding the community by using the invention to collect violating behavior. After the third parties take action or no action on the violation data provided, the third parties will provide feedback to the reporting drivers and other related parties.

FIG. 1 is a diagram of an operating environment 100 that supports a method and system for logging and reporting of slow drivers in fast or middle lanes that are blocking faster vehicles coming from behind in the same lane. The server 102 may be communicatively coupled with a communications network 106, according to an example embodiment. The environment 100 comprises slow vehicle 124, a violating vehicle, that may or not have the claimed subject matter installed in their vehicle and 122, a reporting faster vehicle that has the claimed subject matter installed and is properly operating in a vehicle. The claimed subject matter comprises a computing device in vehicle 122 that communicates with the server 102 via a communications network 106. Vehicle 122 is also associated with a mobile computing device which may comprise a cellular/mobile telephone, smart phone, tablet computer, laptop computer, handheld computer, wearable computer, network connection device, or the like. Vehicle 122 may also comprise other computing devices such as desktop computers, workstations, servers, and game consoles, for example. The mobile computing device 120, and vehicle 122, may or not be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above. Server 102, mobile computing device 120, and vehicle 122 may comprise a computing device 600, described below in greater detail with respect to FIG. 5.

In another embodiment, mobile computing device 120, and fast vehicle 122 may also calculate current geographical position (otherwise referred to as geographical location data) using an on-board processor or a connected processor. In one embodiment, the devices may calculate current position using a satellite or ground based positioning system, such as a Global Positioning System (GPS) system, which is a navigation device that receives satellite or land based signals for the purpose of determining the device's current geographical position on Earth. A satellite navigation system with global coverage may be termed a global navigation satellite system (GNSS). A (global positioning system) GPS receiver, and its accompanying processor, may calculate latitude, longitude and altitude information. In this embodiment, a radio frequency signal is received from a satellite or ground based transmitter comprising a time the signal was transmitted and a position of the transmitter. Subsequently, the device calculates current geographical location data of the device based on the signal. In another embodiment, the device calculates current geographical location using alternative services, such as control plan locating, GSM localization, dead reckoning, or any combination of the aforementioned position services.

The term spatial technologies or spatial processes refers generally to any processes and systems for determining one's position using radio signals received from various sources, including satellite sources, land-based sources and the like.

Server 102 includes a software engine that delivers applications, data, program code and other information to networked devices, such as mobile computing device 120, and vehicle 122. The software engine of server 102 may perform other processes such as transferring multimedia data in a stream of packets that are interpreted and rendered by a software application as the packets arrive.

FIG. 1 further shows that server 102 includes a database or repository 104, which may be a relational database comprising a Structured Query Language (SQL) database stored in a SQL server. Mobile computing device 120, and fast vehicle 122 may also include their own database, either locally or via the cloud. The database 104 may serve contact data, blocking vehicles data, message data, as well as related information, which may be used by server 102, mobile computing device 120, and vehicle 122.

Server 102, mobile computing device in vehicle 122 may each include program logic comprising computer source code, scripting language code or interpreted language code that perform various functions of the disclosed embodiments. In one embodiment, the aforementioned program logic may comprise program module 607 in FIG. 5. It should be noted that although FIG. 1 shows only one mobile computing device 120, two vehicles 122 and 124, and one server 102, the system of the disclosed embodiments supports any number of servers, vehicles and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when mobile computing device 120 and vehicle 122 engage in traffic logging and reporting activities that comprise reading, generating, and storing blocking vehicles data, contact data, message data and related information.

Various types of data may be stored in the database 104 of server 102 (as well as data storage on mobile computing device 120, and vehicle 122) with relation to traffic logging and reporting. For example, the database 104 (or mobile computing device 120, and vehicle 122) may store one or more user records for each vehicle or user. A user record may include a user name, address, age, location, credit card information, email address, phone number, vehicle type, vehicle make, vehicle model, vehicle VIN number, vehicle color, license plate data, vehicle efficiency information, driver's license data, vehicle registration data, etc.

In another example, the database 104 (as well as data storage on mobile computing device 120, and vehicle 122) may store data and message data on the driving behavior of blocking vehicles as recorded by the two cameras and the video recorder, the onboard diagnostics (OBD) information, the GPS feed and facial recognition technology are all in stored and operating in vehicle 122.

Vehicle 122 is referred to as the reporting or faster vehicle. The collected data will show the date and the time of vehicle 124 and its slow blocking behavior. Also the weather conditions for each blocking vehicles incident, the speed of each vehicle in each blocking incident, the number of times a slow driver blocks a faster vehicle.

Also, the geographical locations of each blocking vehicle, etc. blocking vehicles data may also include images, photographs and videos of a vehicle that has been passed or of the vehicle being passed itself. Message data may include text message data, audio message data, video message data, unique identifiers, code data, etc. In another embodiment, any of the data mentioned above may be stored in a separate file or record that is associated with a corresponding user record.

FIG. 2 is a diagram showing the data flow of the general process for logging and reporting on slow drivers in a fast or a middle lane, according to an example embodiment;

In step 202 fast vehicle 122 collects data on Slow Vehicle 124. In step 204 fast vehicle 122 sends the data to the server. In step 206 the server sends the date to the Violator Clearinghouse. In step 208, third parties determine if there is a violation. In step 210, third parties report results to Violator Clearinghouse.

Figure 3A:
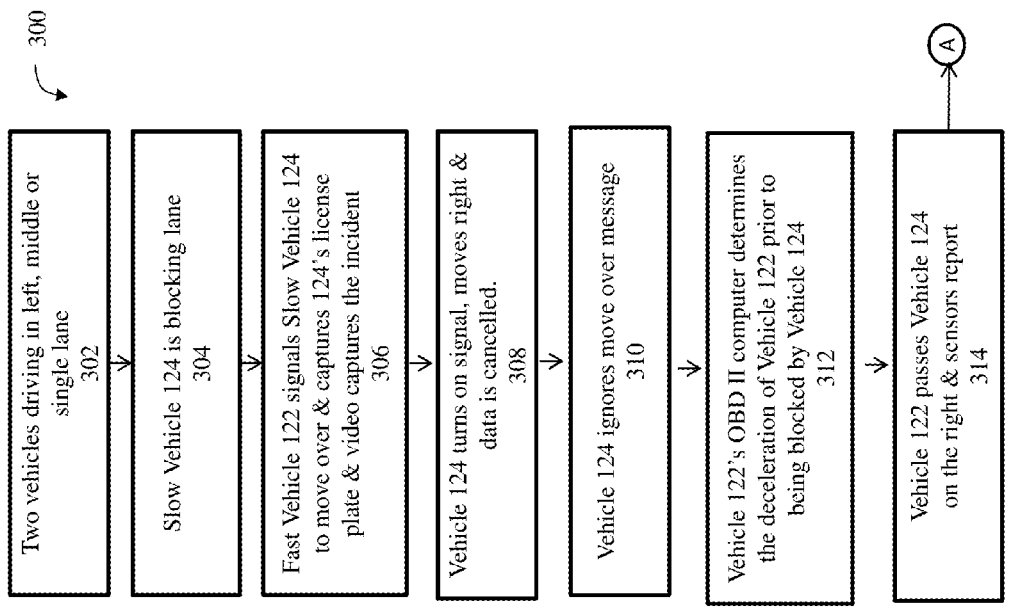
FIGS. 3A and 3B are a flow chart showing the control flow of the process for logging and reporting on slow drivers in fast or middle lanes, according to an example embodiment.
Figure 3B:
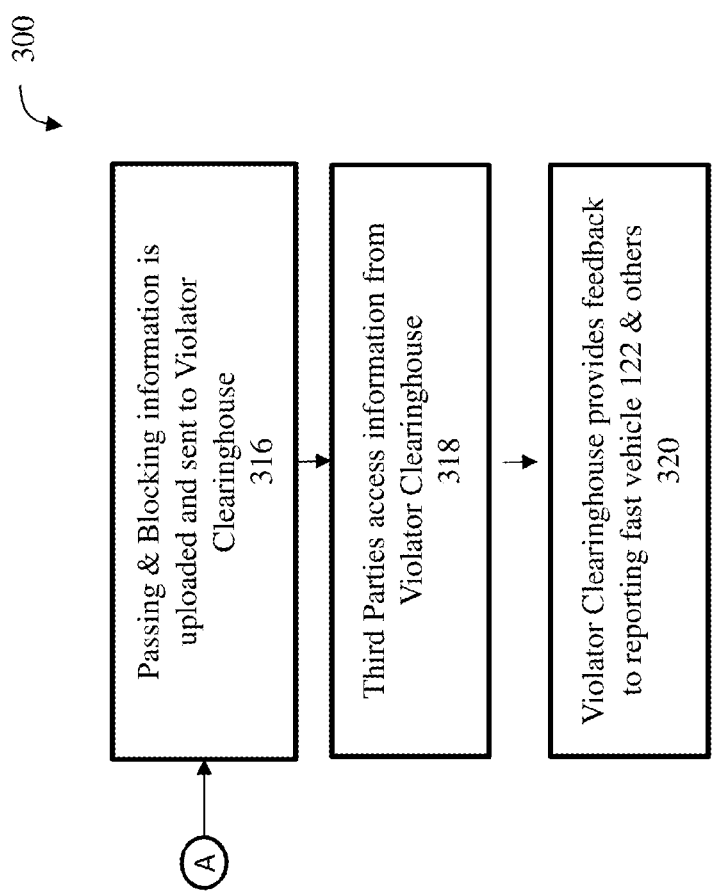

FIGS. 3A and 3B are a flow chart showing the control flow of the process 300 for logging and reporting on slow drivers in a fast or middle lane, according to an example embodiment. Process 300 describes the steps that occur when the systems 100 and 400 are used in a traffic logging and reporting scenario. The process 300 is described with reference to FIG. 2, which shows the general data flow 200 of the process 300. Process 300 starts with step 302 wherein vehicles 122 and 124 are traveling in the left or middle lane driving at two different speeds. Vehicle 124 is in the lead and is going 55 mph while vehicle 122 is coming from behind and is going faster at 70 mph. In step 302, two are vehicles are driving in the left or middle lane or in a single lane.

In step 304, slow vehicle 124 is blocking fast vehicle 122. In step 306, fast vehicle 122 signals the slow vehicle 124 to move over. In step 306, a camera on vehicle 122 takes an image or photograph of the vehicle 122 including its license plate, and stores said image or photograph. Said camera or camera may be located anywhere on the vehicle, including the forward area, the rear, the left side or the right side. In step 308, slow vehicle 124 turns on his right hand directional signal indicating that he intends to move over to the right hand lane and the data is cancelled. In step 310, slow vehicle 124 ignores the message to move over. In step 312, fast vehicle 122's OBD II computer determines the deceleration of Vehicle 122 prior to be blocked by slow vehicle 124. In step 314, fast vehicle 122 passes slow vehicle 124 on the right and sensors generate and store said blocking vehicle's data. In step 316, the passing and blocking information is uploaded and sent to the Violator Clearinghouse. In step 318, third parties access information from the Violator Clearinghouse. In step 320, the Violator Clearinghouse provides feedback to reporting fast vehicle 122 and others.

Figure 4:
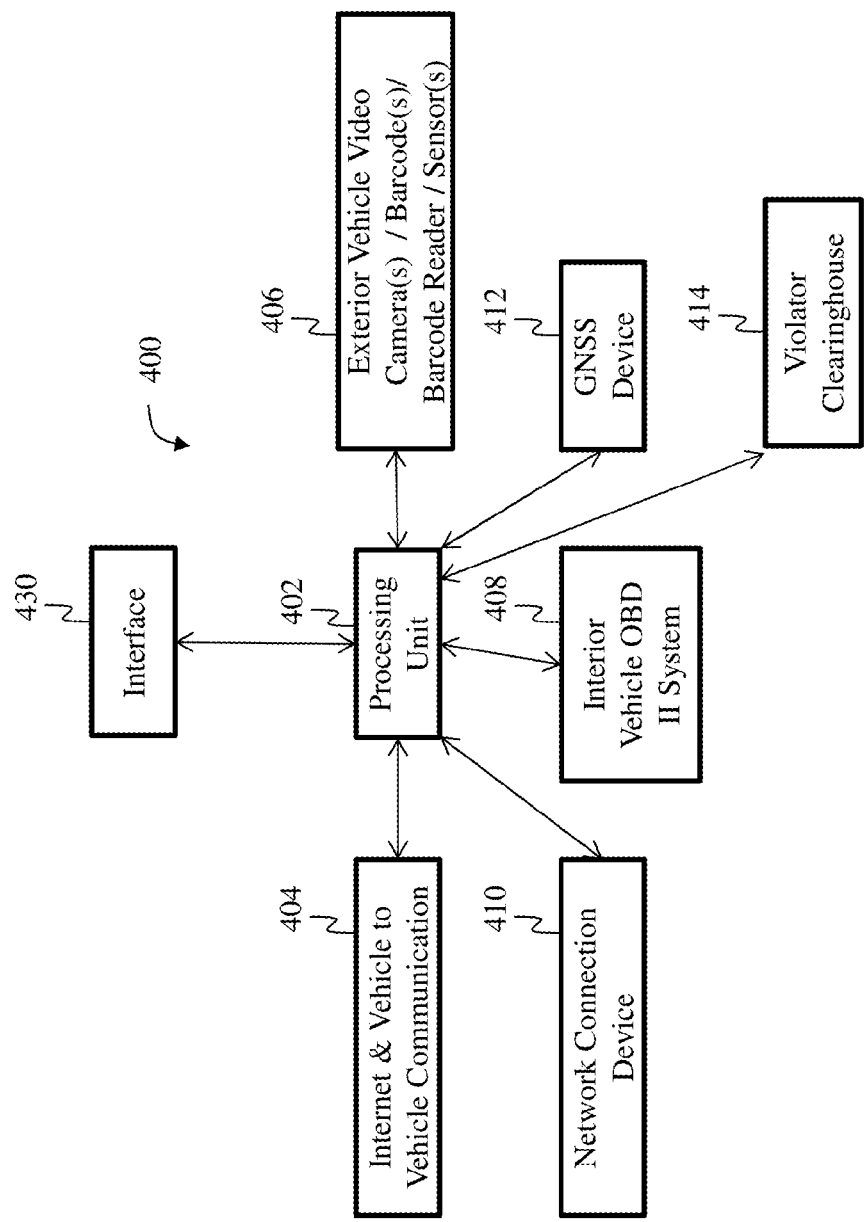
FIG. 4 is a block diagram showing the main components in a reporting vehicle, according to an example embodiment.

FIG. 4 is a block diagram showing the main components of a system 400 on a vehicle, such as 122, according to an example embodiment. The system 400 includes a processor or processing unit 402 (described in more detail below with reference to FIG. 5) communicatively coupled with the other components. Interior Sensors 408 refer to the OBD II system measuring data pertaining to the vehicle on which the system 400 is located, such as speed sensors, engine status, etc. The system 400 also includes a radio or the Internet 404 for vehicle-to-vehicle communications, which may include a radio transmitter and receiver, as well as geographical location sensors, such as a GPS or GNSS system 412. The V to V (Vehicle to Vehicle) uses dedicated portion of wireless spectrum, as well as, a new wireless standard 802.11p to authenticate each message. The system 400 also includes a network connection device 410, used for communicatively coupling the system 400 to the network 106, described in greater detail below with reference to FIG. 6. The system 400 includes a set of video cameras 406, used for taking images, photographs, video, etc. Exterior Sensors 406 refer to the video cameras, sensors, etc. that capture and record the driving behavior of vehicle 122 and vehicle 124. The system 400 may also include human interface 430 that may include a screen, display, microphone, speakers, buttons, touchscreen, horns, sounds, lights, etc. The violator clearinghouse 414 is also shown in FIG. 4.

The video of slow drivers 406 can also be utilized to ascertain the existence of poor highway visibility conditions, which is useful in providing a warning to drivers to slow down because of dangerous visibility conditions. The amplitude of the return signal received by the vehicle sensor is proportional to the atmospheric transmittance (visibility).

In one embodiment, the processor 402 is in the fast vehicle 122 and is configured for detecting a speed of the vehicle and disabling the video recording when the vehicle's speed is below a predefined threshold, and then enabling the video to operate again when the vehicle's speed is above a predefined threshold.

The system 400 of fast vehicle 122 may include a set of pre-recorded voice messages, flashing lights or other signals, wherein the transmitter of vehicle 122 is configured to transmit certain ones of the pre-recorded messages or other signals to vehicle 124, when the video vehicle 122 detects the passage of vehicle 122 on the right side of vehicle 124. V to V communication can also accomplish the above.

Figure 6:
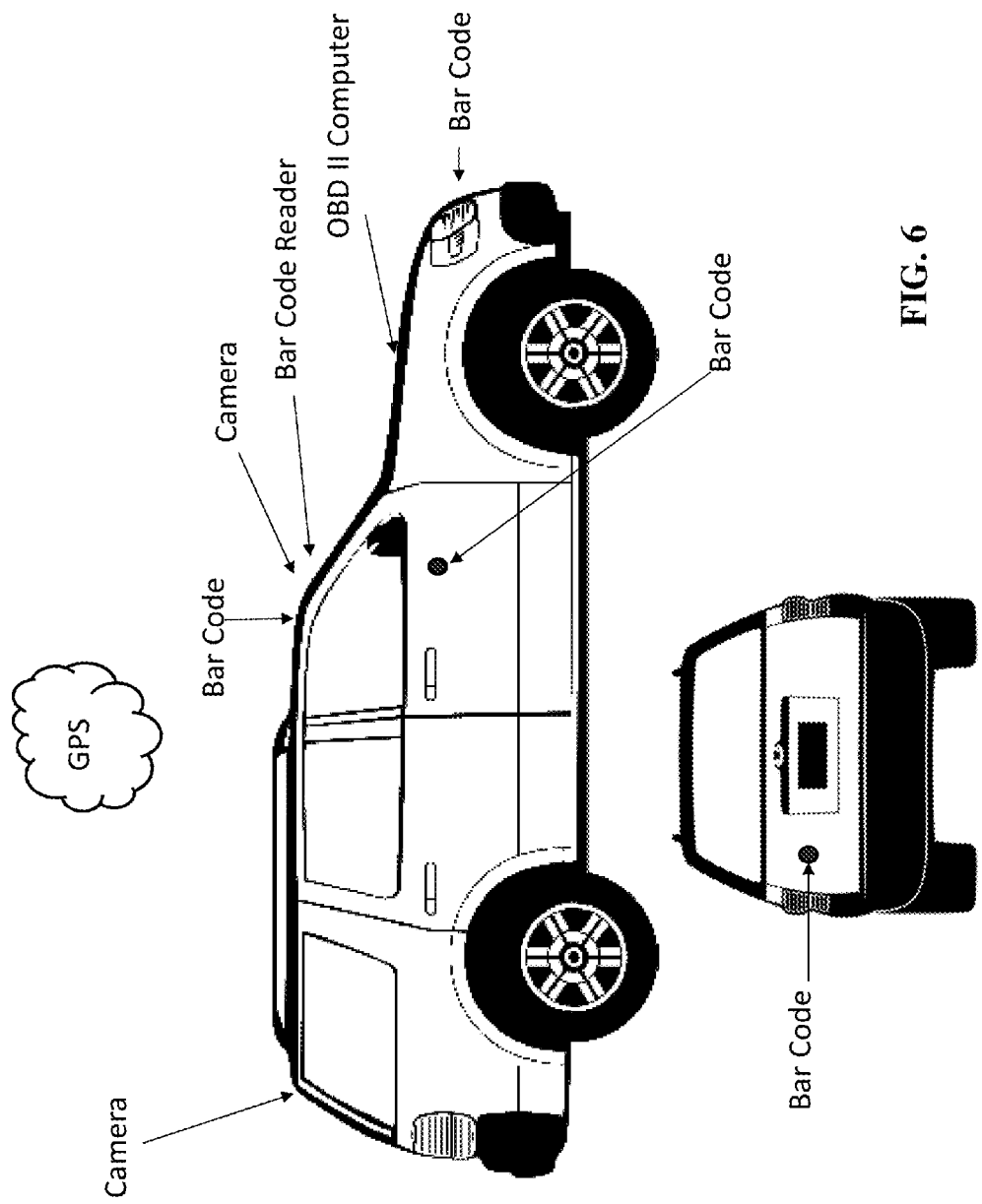
FIG. 6 is an illustration of the front and rear video camera, OBD II computer, bar code reader, bar code on front back and back side of a vehicle, according to an example embodiment.

Once vehicle 122 passes vehicle 124 on its right side, the video camera in FIG. 6 records this as a passing occurrence that vehicle 124 was blocking vehicle 122 and did not move over. The entire video of the incident along with other pertinent data (time of day, license plate number of vehicle 124, highway marked, the municipality where it happened, etc.) will be forwarded by the server 102 and to 414 the system, Violator Clearinghouse.

In one embodiment, the environment 100 may operate in conjunction with autonomous vehicles without having any conflict. Additionally, in one embodiment, the blocking vehicle data 202, 208 may be stored by server 102 online and made accessible such that drivers may go online to see their driver history, i.e., how many times drivers have been passed. Drivers may also view all stored blocking vehicle data, and view how many vehicles their system has reported. Viewers may see a trend regarding the same license plate showing up in multiple reports. Also, if a vehicle does not have the system 400, it could be alerted to a fast lane violation through the driver's cell phone, Bluetooth, WI-FI, mail or its equivalent.

FIG. 4 shows that the system 400 may include cameras with a forward facing view and a rear facing view to capture license plate numbers and a photograph or identification of the driver, an Identification Module (IM) operating by the onboard diagnostics (OBD II) or the Internet with video recording of the vehicle's driver via Facial Recognition and rear license plate for authentication purposes, operating as part of the camera, via the onboard diagnostics (OBD) with sensor/receiver ports located on the vehicle for driver/vehicle identification and authentication purposes, and a "Please Move Over" (PMO) message that may be sent by a faster vehicle 122 to a slow vehicle 124 (in front) that is blocking traffic in the fast lane, wherein the message is composed of distinctive sounds and lights that can only operate when a slower vehicle is immediately in front of the fast vehicle.

Figure 7:
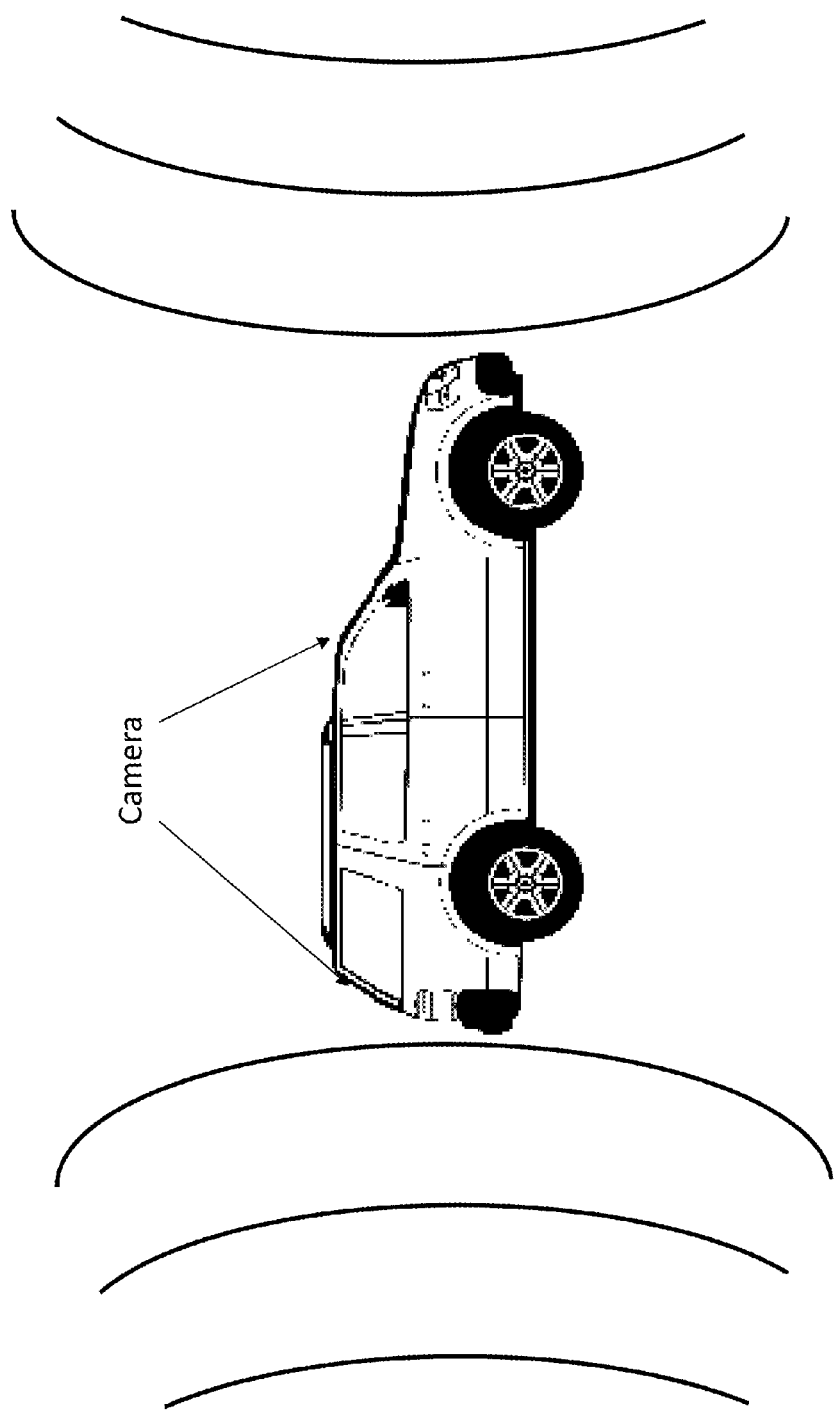
FIG. 7 is an illustration of the position of video cameras on the front and back of a reporting vehicle, according to an example embodiment.
Figure 8:
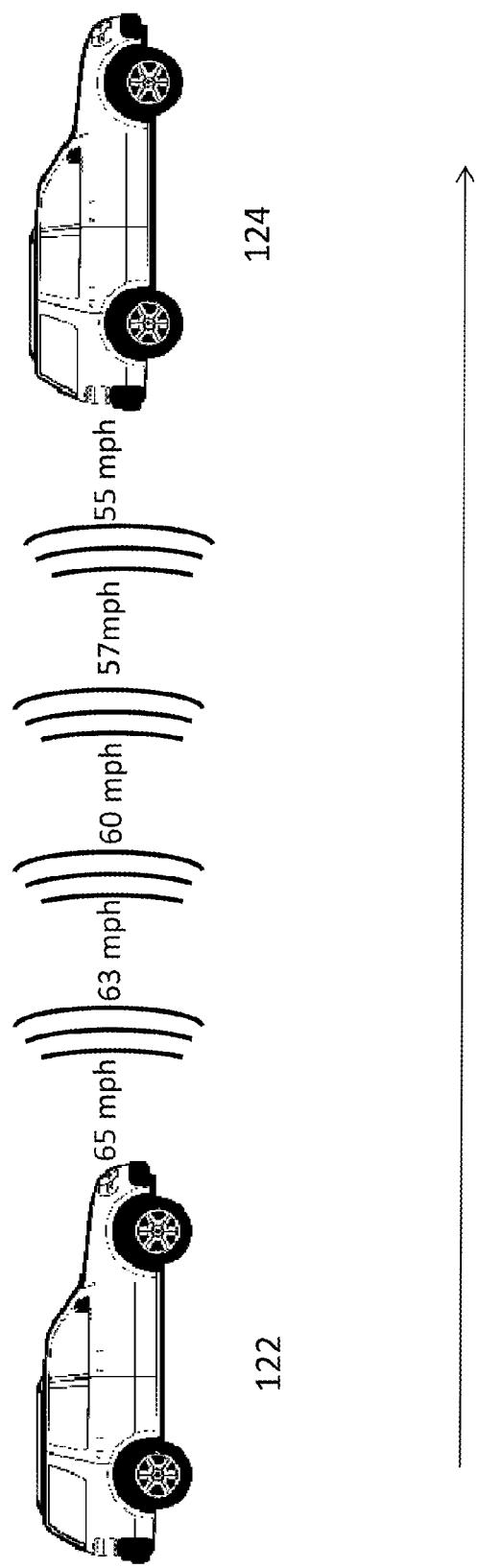
FIG. 8 is an illustration that shows how a fast vehicle driving in the left or middle lane must deaccelerate when coming upon a slower blocking vehicle in the same lane, according to an example embodiment.
Figure 9:
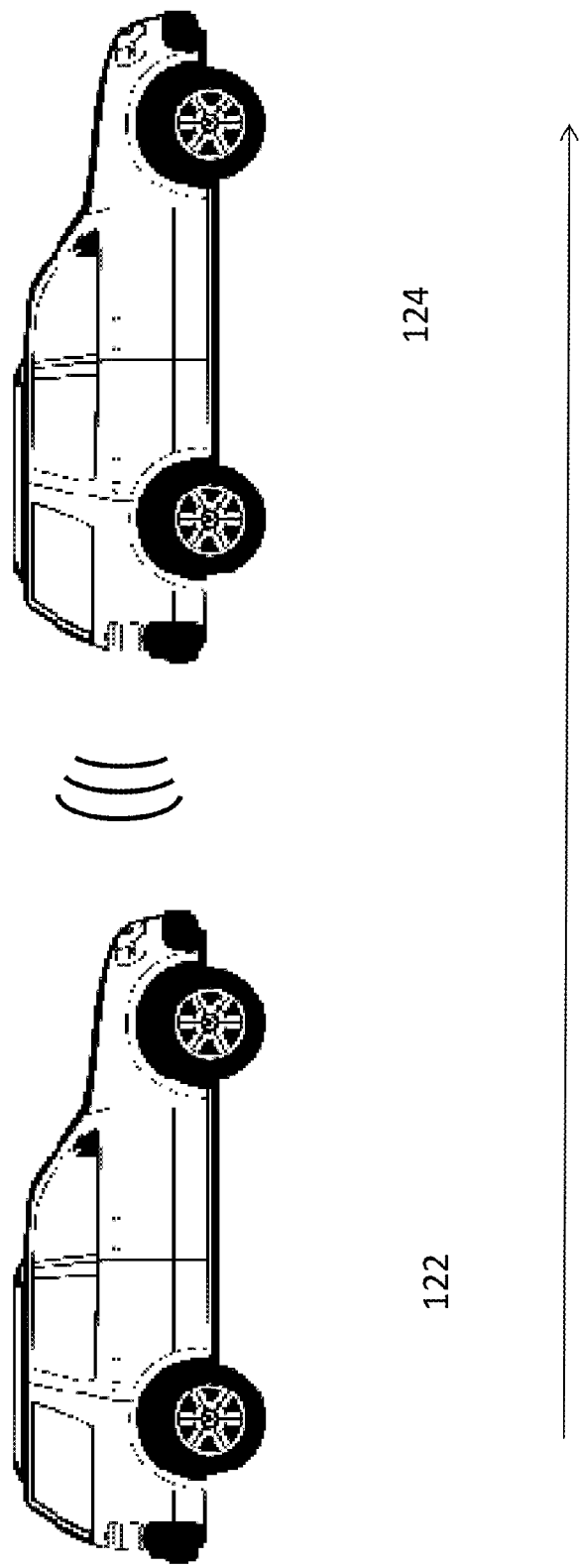
FIG. 9 is an illustration showing how the fast vehicle sends a message to the slow vehicle to move over, according to an example embodiment.
Figure 10:
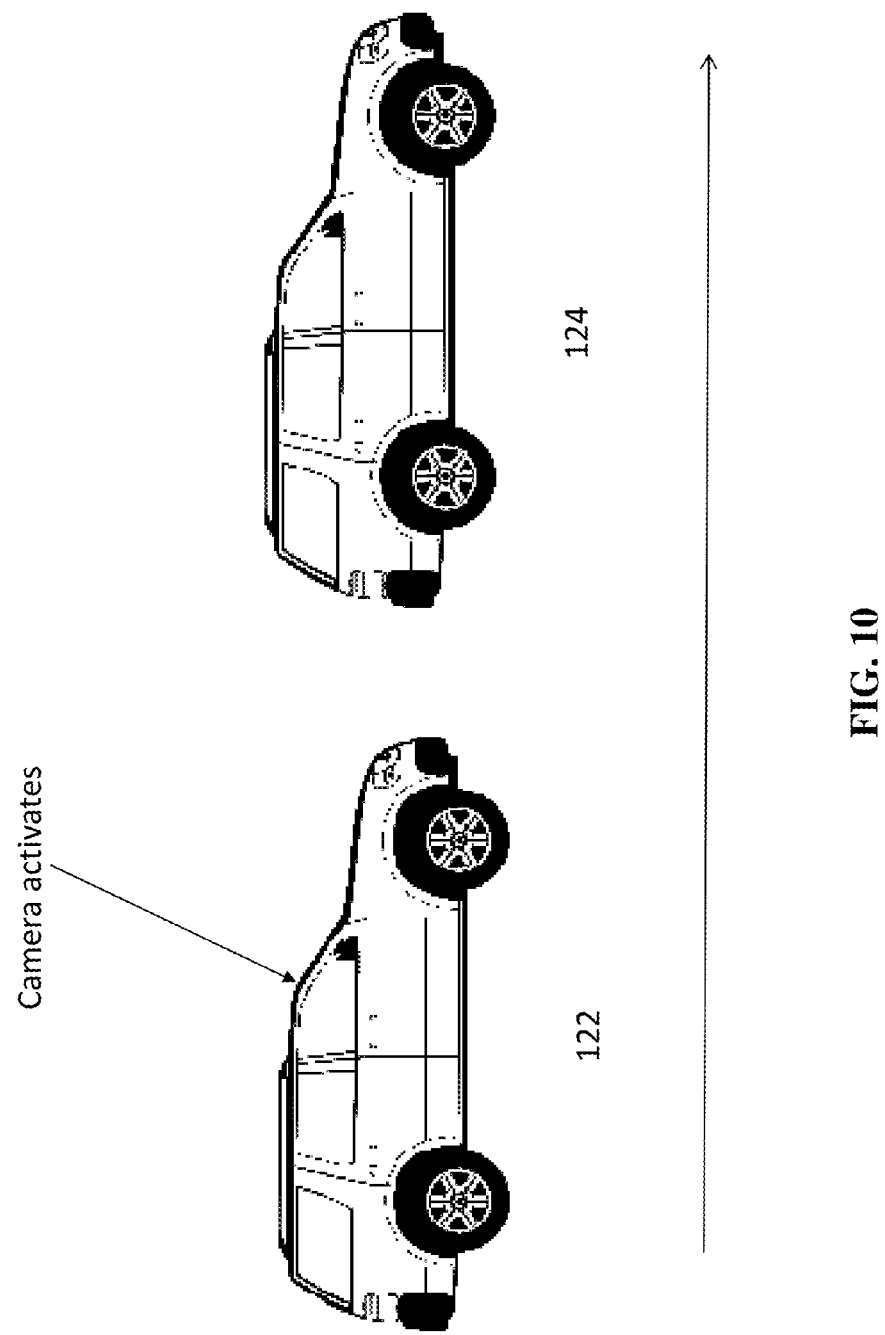
FIG. 10 is an illustration showing a slow driver refusing to move over, according to an example embodiment.

FIG. 6 is a block diagram showing additional components of a system on a vehicle, according to an example embodiment. FIG. 6 shows that the system 400 may include a camera with a forward facing view to capture license plate number, a rear facing camera to capture facial recognition of the slow driver when his vehicle is passed. FIG. 7 shows the range for the system's video cameras. FIG. 8 illustrates the OBD II ability to record the fastest speed for an approaching vehicle 122 and the speed it had to reduce to avoid hitting vehicle 124. FIG. 9 illustrates the signal(s) to move over, which is sent by 122 to 124, and includes short horn blasts and/or flashing of lights, V to V communication, among other things. FIG. 10 illustrates that a violation starts after a predefined period of time after the message is sent and the driver 124 refuses to move over.

Figure 11:
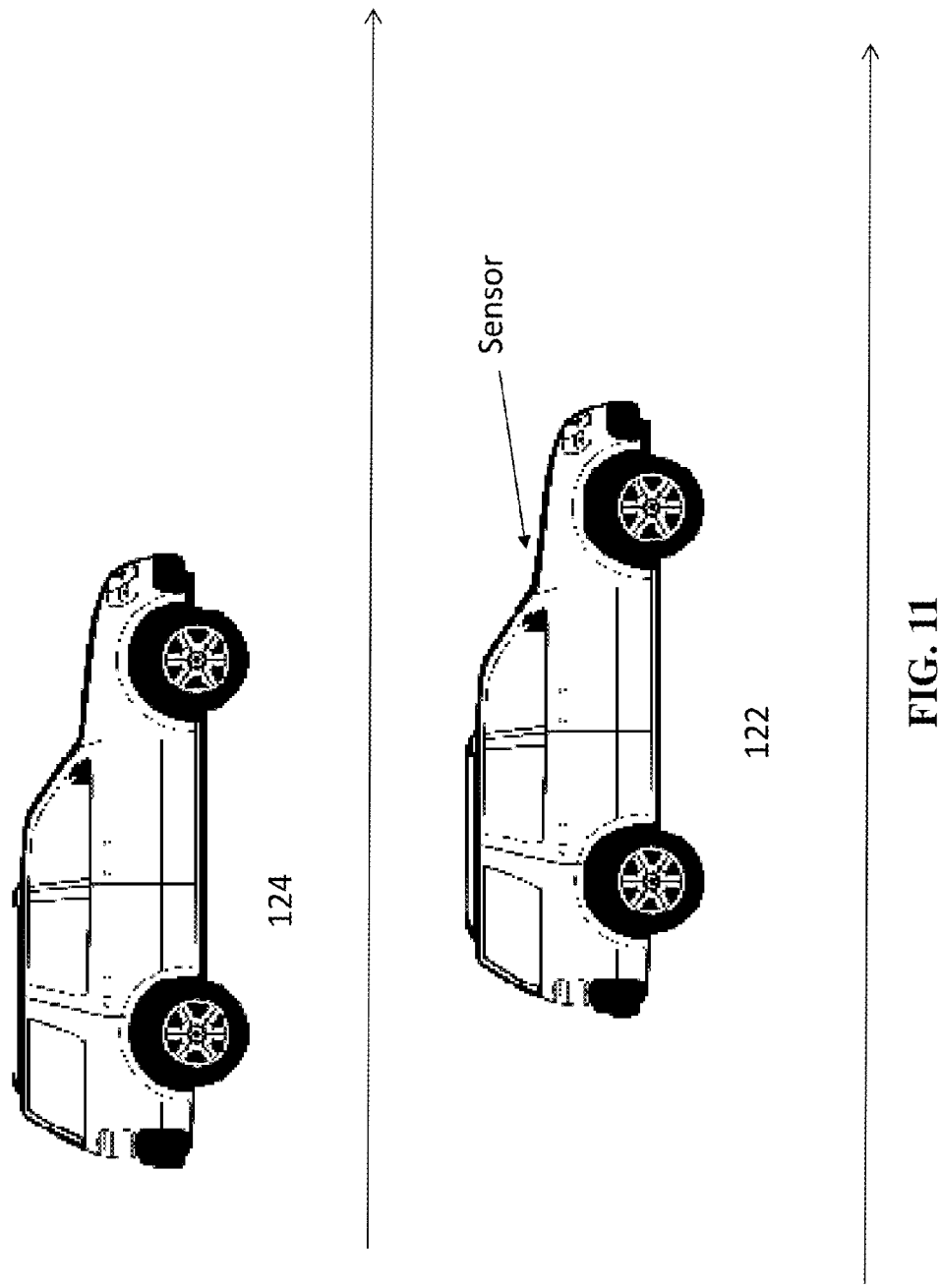
FIG. 11 is an illustration showing a fast driver using the right lane or middle lane to pass the slow driver, i.e., the blocking vehicle, according to an example embodiment.
Figure 12:
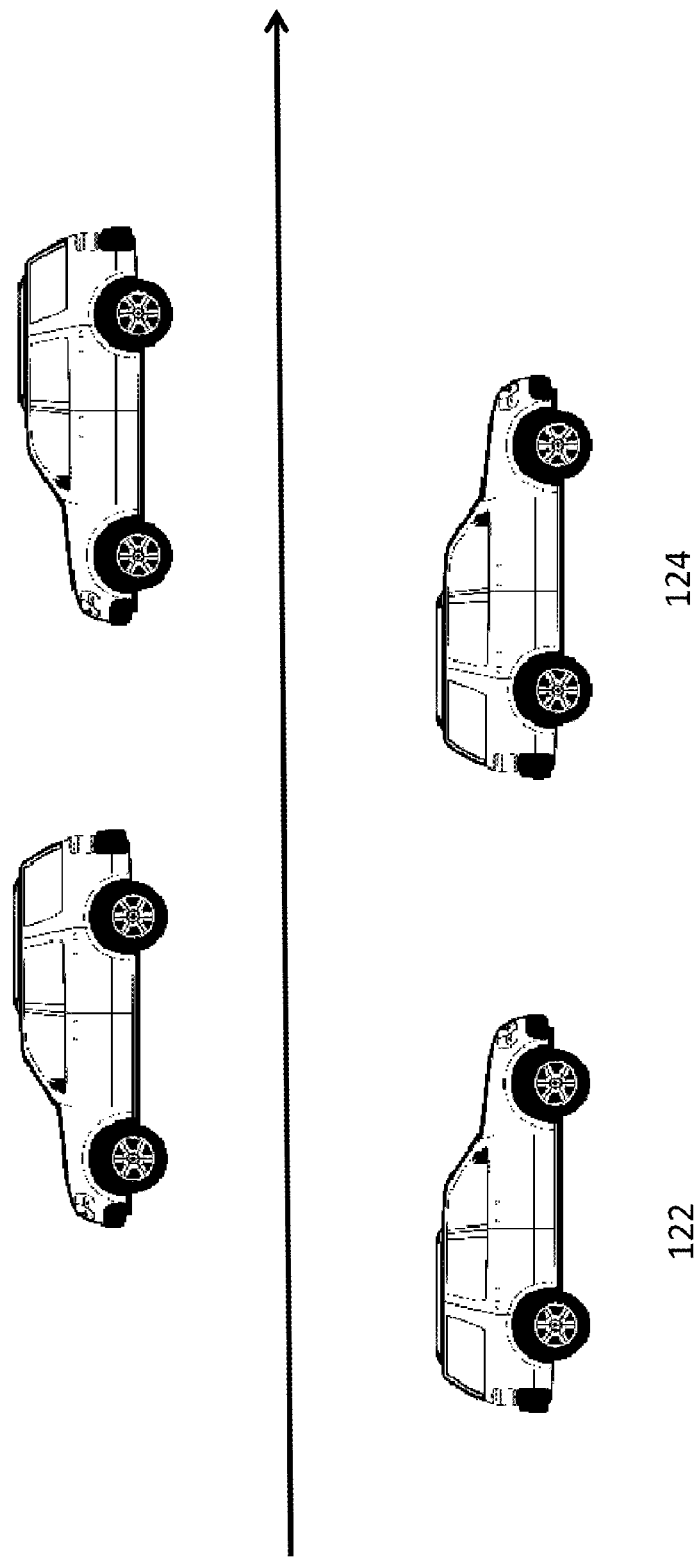
FIG. 12 is a diagram showing a violation on a two lane road, according to an example embodiment.
Figure 13:
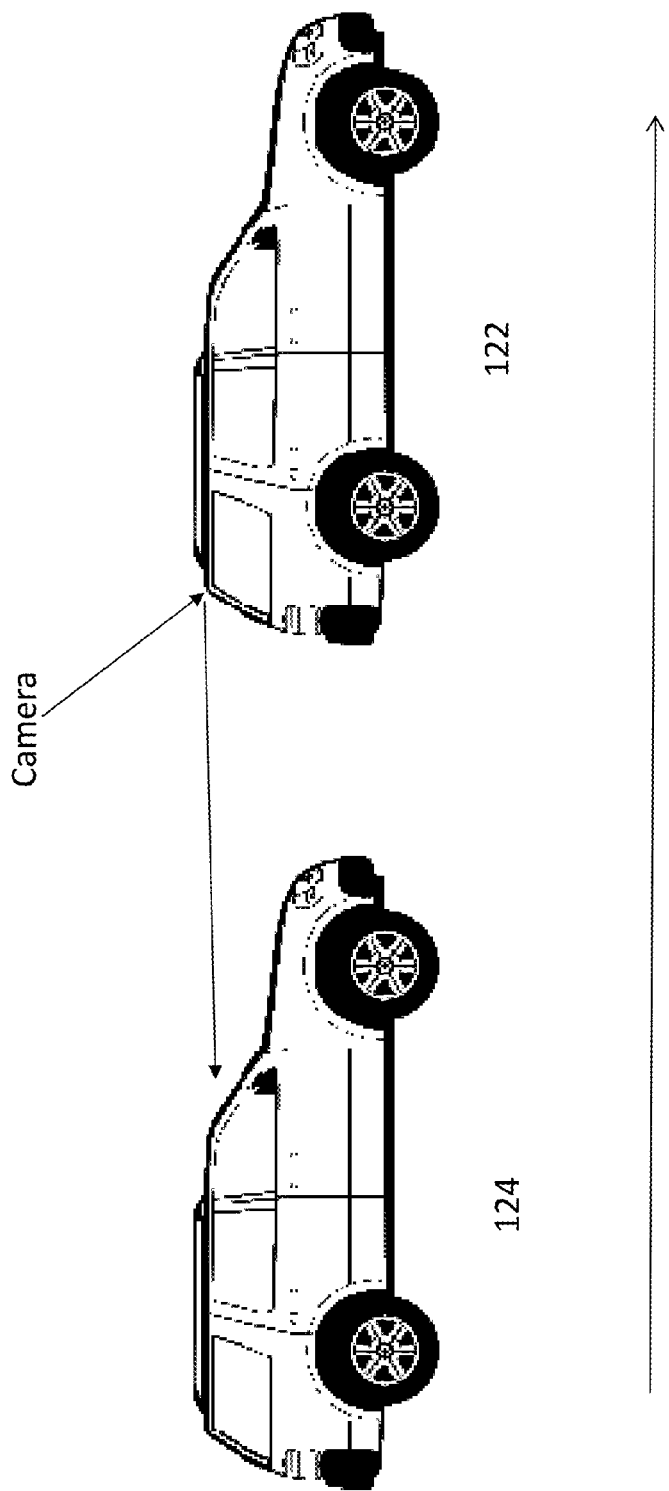
FIG. 13 is a diagram showing a leading fast vehicle using a rear view video camera to capture the facial image of a slow driver in a slow vehicle after the slow vehicle has been passed, according to an example embodiment.
Figure 14:
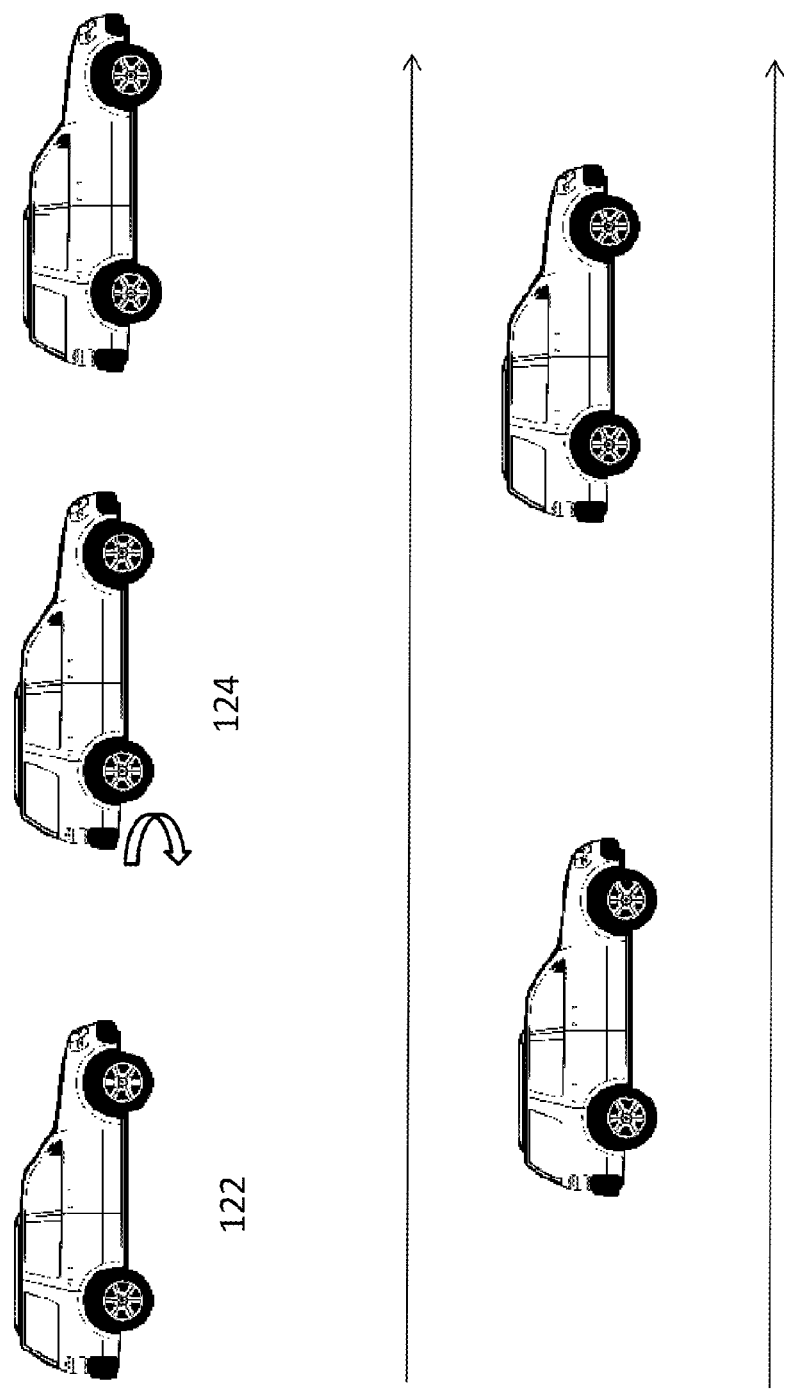
FIG. 14 is an illustration showing no violation when a slow vehicle has its directional signal on to signal that it has received the message and will move over when possible, according to an example embodiment.
Figure 15:
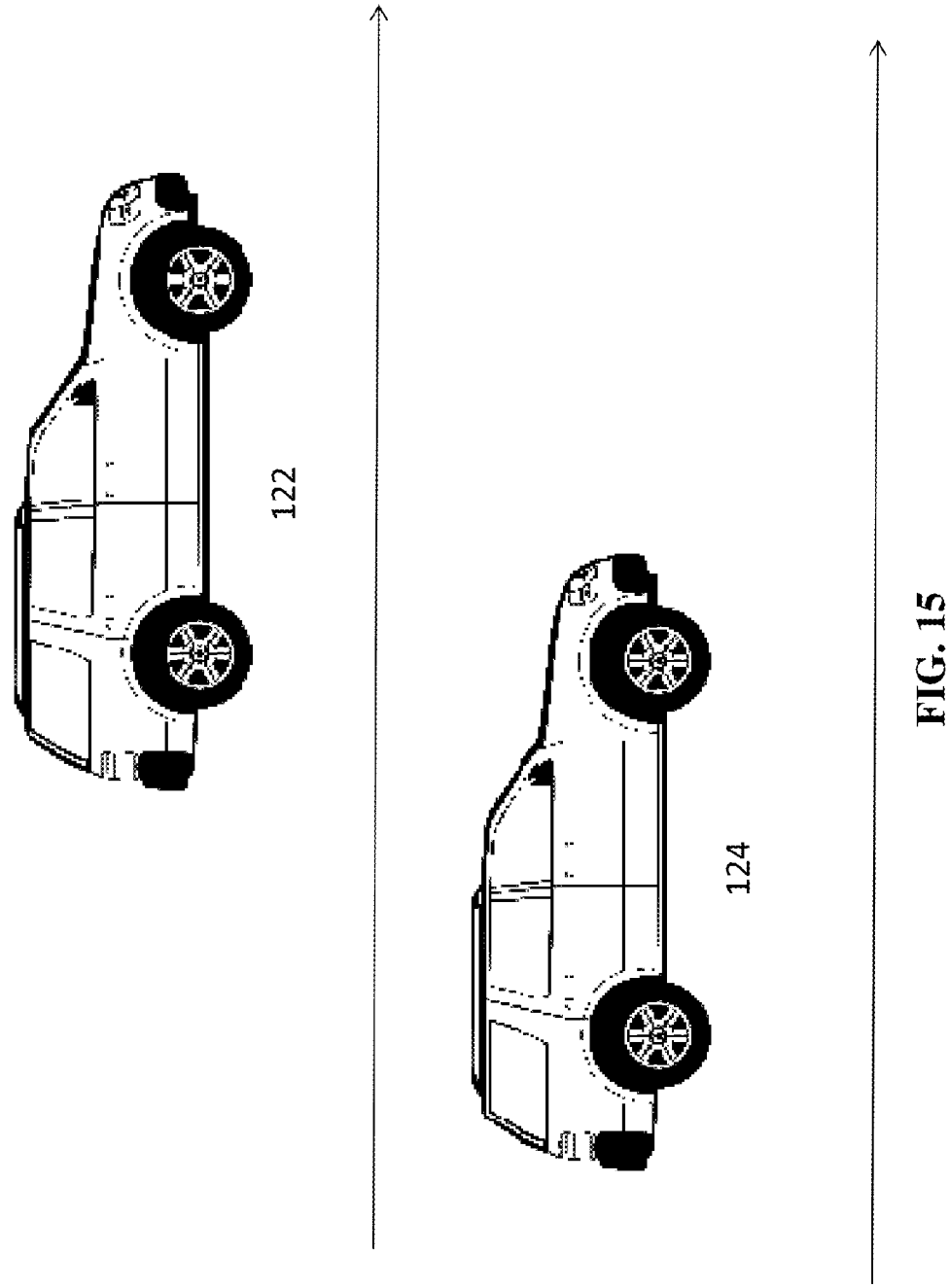
FIG. 15 is an illustration showing a slow vehicle moving over to the slow lane, after receiving the signal(s) to move over, according to an example embodiment.
Figure 16:
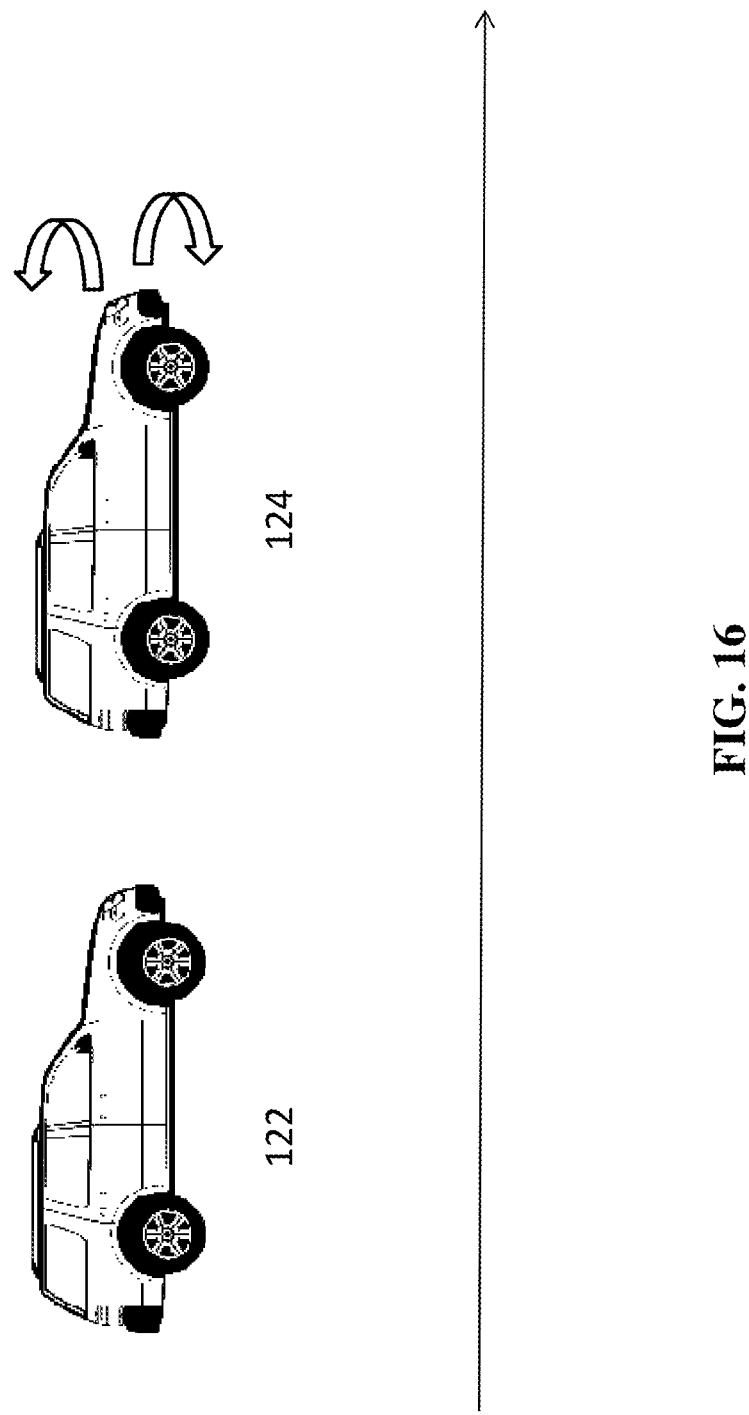
FIG. 16 is a diagram showing no violation when a blocking slow vehicle has its directional signal on, indicating that it is turning left or right when possible, according to an example embodiment.
Figure 17:
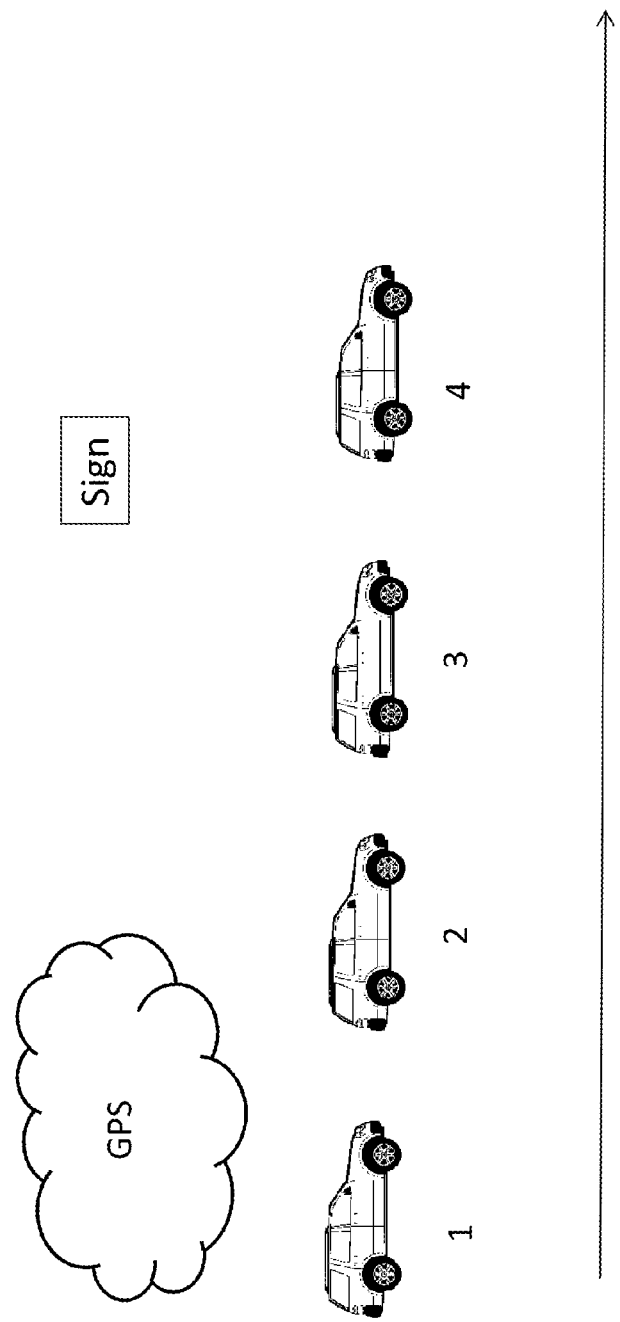
FIG. 17 is a block diagram shows no violation when GPS or an overhead sign shows heavy traffic, school bus, accident, weather conditions, etc. in front of the blocking vehicle, according to an example embodiment.
Figure 18:
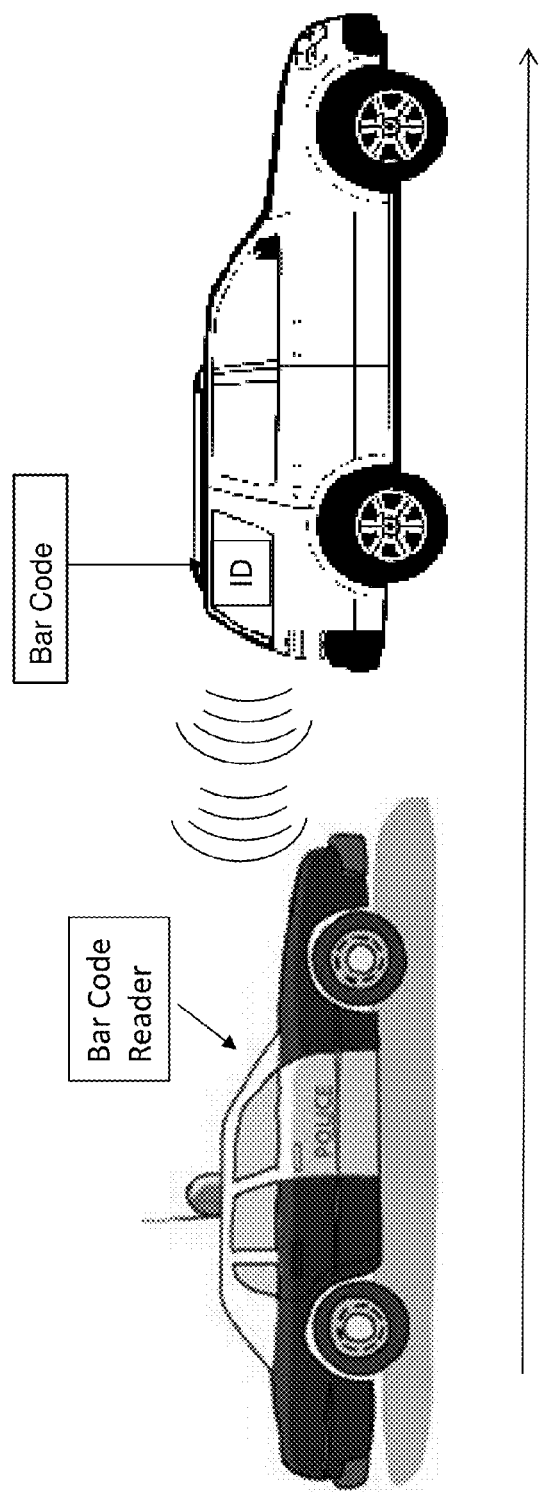
FIG. 18 shows a police vehicle reading a bar code on a vehicle.

FIG. 11 shows a violation occurs when vehicle 122 in the slow lane passes vehicle 124 driving in the fast or middle lane on its right or left side when a photo eye sensor captures the passing. FIG. 12 shows a two lane road with a slow vehicle driving below the speed limit with a faster vehicle behind. A violation occurs if the slow vehicle, after receiving a signal(s), does not speed up or move over to the side of the road. FIG. 13 shows a rear mounted video camera capturing the identity of the driver of the slow vehicle 124, after the slow vehicle has been passed. FIG. 14 shows no violation occurs when a blocking vehicle attempts to move to the right lane or simply puts on his turning signal to indicate he is going to move over. FIG. 15 shows no violation occurs when a slow vehicle 124 moves over to the right lane. FIG. 16 shows a scenario wherein slow vehicles in fast lanes with turning signals activated will not be reported as a violator. FIG. 17 shows a scenario wherein vehicles are in slow speed zones, construction zones, school zones, weather conditions or accident zones. In this case, the violation notification system will cease operating. GPS technology may provide the necessary guidance to effect such "on or off" status for the claimed subject matter system technology. FIG. 18 shows a police officer reading a bar code of a vehicle.

Figure 5:
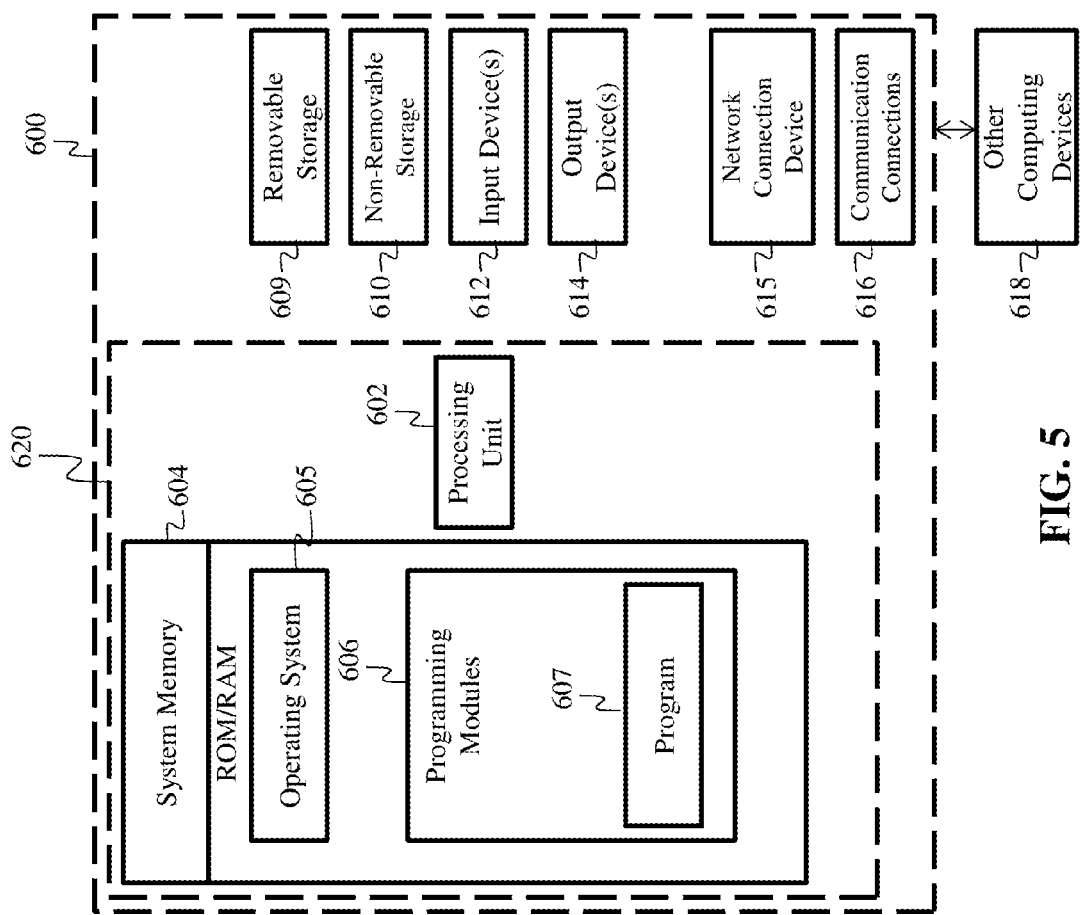
FIG. 5 is a block diagram of a system including a computing device, according to an example embodiment.

FIG. 5 is a block diagram of a system including an example computing device 600 and other computing devices. Consistent with the embodiments described herein, the aforementioned actions performed by server 102, device 120, or computers in vehicles 122, 124 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for systems 100, 400 and processes 200, 300, as described above. Processes 200, 300 may operate in other environments and are not limited to computing device 600.

With reference to FIG. 6, a system consistent with an embodiment herein may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), nonvolatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of the computing devices of vehicles 122, 124, server 102, device 120. Furthermore, embodiments herein may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 200, 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to embodiments herein. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments herein have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

The claimed subject matter records and, through its effects, changes the behavior of slow drivers in the left or middle lane and the manner in which the slow drivers operate their vehicle and block faster vehicles in the fast or middle lane of roads and highways. The claimed subject matter acts as an educational, and potentially an enforcement, tool for all drivers on roads and highways, especially slow drivers in the fast and middle lanes. The claimed subject matter reduces traffic congestion and lessens the need for faster drivers to impulsively switch from the fast left lane over to slower right lane and back again to the fast lane, which can cause accidents. Effectively, the claimed subject matter improves drivers' operational behavior on a daily basis, especially slow drivers blocking up fast or middle lanes.

One of the most important requirements and features of the invention is that only one vehicle (a reporting vehicle or a police car) is needed to operate the invention; thus, reducing accidents and savings lives/injuries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system on a reporting vehicle for logging and reporting on slow drivers in a lane, the system comprising of a set of the following:
   a forward facing video camera configured for capturing images of a license plate of a slow vehicle in front of the reporting vehicle;
   a rear facing video camera configured for capturing images of a face of a driver of the slow vehicle, after the reporting vehicle has passed the slow vehicle;
   an on-board diagnostics (OBD) system for recording speed data;
   a global positioning system (GPS) system for recording global positioning data;
   a set of proximity sensors for detecting presence of the slow vehicle when the reporting vehicle passes the slow vehicle;
   a transmitter configured for wirelessly transmitting information to a third party via a communications network; and
   a processor communicatively coupled with the forward facing video camera, the rear facing video camera, the OBD system, the GPS system, and the set of proximity sensors, wherein the processor is configured for:

a) detecting the slow vehicle in front of the reporting vehicle based on the speed data from the OBD system;
b) taking and storing images of a rear of the slow vehicle using the forward facing video camera;
c) detecting passing of the slow vehicle on the left side of the reporting vehicle using the set of proximity sensors;
d) taking and storing images of a front of the slow vehicle using the rear facing video camera, after the reporting vehicle has passed the slow vehicle;
e) taking and storing global position data of the reporting vehicle using the GPS system; and
f) transmitting the speed data, the images of the rear of the slow vehicle, images of the front of the slow vehicle and the global position data that was taken and stored to the third party via the communications network, using the transmitter.

2. The system of claim 1, wherein the set of proximity sensors are positioned as follows: a subset of said set of proximity sensors are located near a front bumper and a subset of said set of proximity sensors are located near a rear bumper.

3. The system of claim 2, wherein said set of proximity sensors comprise laser based sensors.

4. The system of claim 3, wherein said set of proximity sensors comprise global navigation satellite system based sensors.

5. The system of claim 1, wherein a subset of said set of proximity sensors are located at or near forward corners of the reporting vehicle.

6. The system of claim 5, wherein a subset of said set of proximity sensors are located at or near rear corners of the reporting vehicle.

7. The system of claim 1, wherein the computing system resides on a smart phone.

8. The system of claim 1, further comprising a barcode reader for reading a barcode on the slow vehicle.

9. The system of claim 1, wherein the processor is further configured for transmitting the speed data, the images of the rear of the slow vehicle, images of the front of the slow vehicle and the global position data that was taken and stored to the reporting vehicle via the communications network, using the transmitter.

10. The system of claim 9, wherein the processor is further configured for transmitting certain ones of a set of pre-recorded messages or other signals to the slow vehicle.

11. A computing system on a reporting vehicle for logging and reporting on slow drivers in a lane, the system comprising of a set of the following:
a forward facing video camera configured for capturing images of a license plate of a slow vehicle in front of the reporting vehicle;
a rear facing video camera configured for capturing images of a face of a driver of the slow vehicle, after the reporting vehicle has passed the slow vehicle;
an OBD system on the reporting vehicle for recording speed data;
a GPS system on the reporting vehicle for recording global positioning data;
a set of proximity sensors for detecting presence of the slow vehicle when the reporting vehicle passes the slow vehicle;
a transmitter configured for wirelessly transmitting information to a third party via a communications network; and
a processor communicatively coupled with the forward facing video camera, the rear facing video camera, the OBD system, the GPS system, and the set of proximity sensors, wherein the processor is configured for:
a) detecting the slow vehicle in front of the reporting vehicle based on the speed data from the OBD system;
b) taking and storing images of a rear of the slow vehicle using the forward facing video camera;
c) detecting passing of the slow vehicle on the right side of the reporting vehicle using the set of proximity sensors;
d) taking and storing images of a front of the slow vehicle using the rear facing video camera, after the reporting vehicle has passed the slow vehicle;
e) taking and storing global position data of the reporting vehicle using the GPS system; and
f) transmitting the speed data, the images of the rear of the slow vehicle, images of the front of the slow vehicle and the global position data that was taken and stored to the third party via the communications network, using the transmitter.

12. The system of claim 11, wherein said set of proximity sensors comprise laser based sensors.

13. The system of claim 12, wherein said set of proximity sensors comprise global navigation satellite system based sensors.

14. The system of claim 13, wherein a subset of said set of proximity sensors are located on a side of the reporting vehicle.

15. The system of claim 14, wherein a subset of said set of proximity sensors at or near rear corners of the reporting vehicle.

16. The system of claim 11, wherein the computing system resides on a smart phone.

17. The system of claim 11, further comprising a barcode reader for reading a barcode on the slow vehicle.

18. The system of claim 11, wherein the processor is further configured for transmitting the speed data, the images of the rear of the slow vehicle, images of the front of the slow vehicle and the global position data that was taken and stored to the slow vehicle via the communications network, using the transmitter.

19. The system of claim 18, wherein the processor is further configured for transmitting certain ones of a set of pre-recorded messages or other signals to the slow vehicle.

* * * * *